Patented July 27, 1943

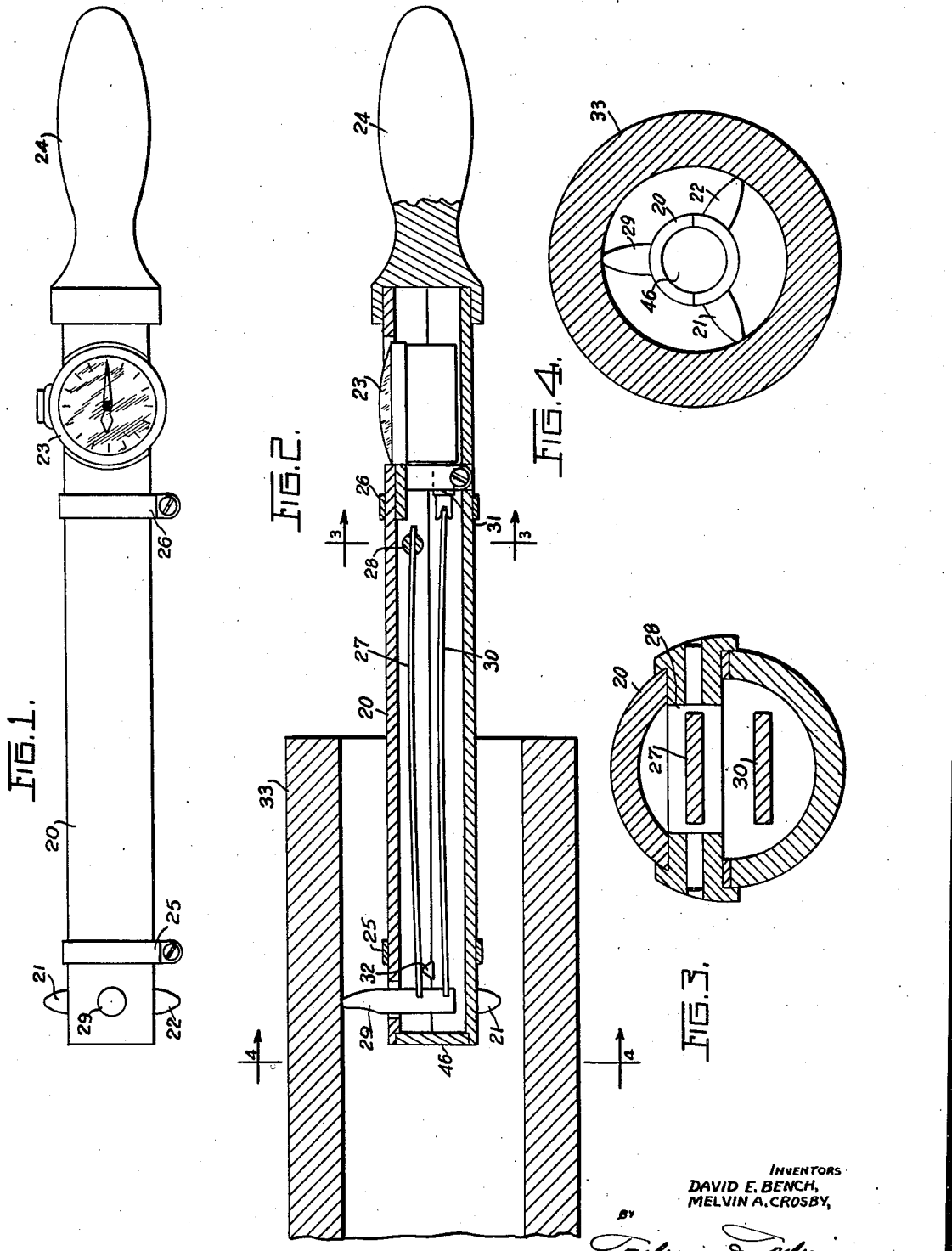

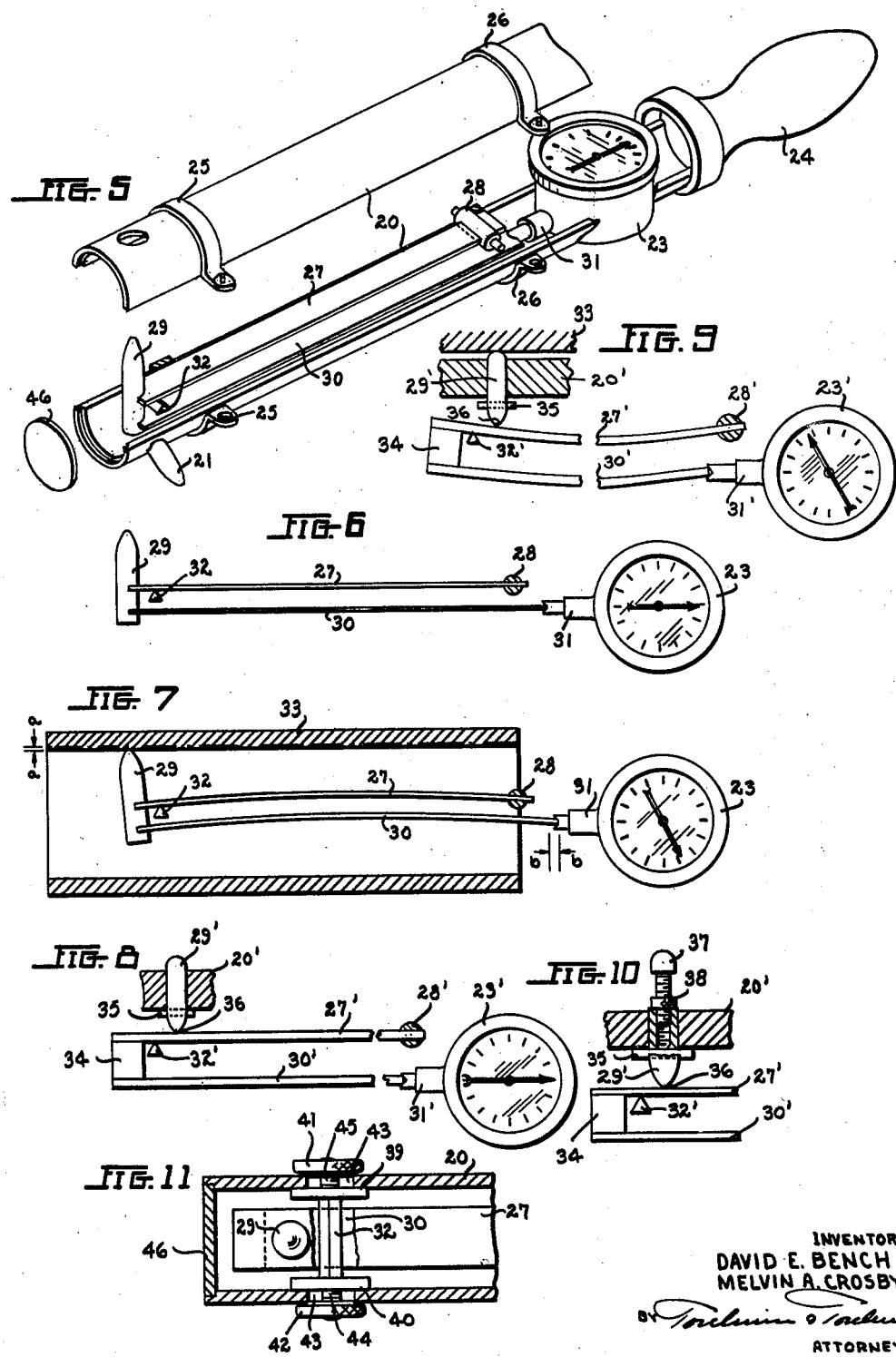

2,325,299

UNITED STATES PATENT OFFICE 2,325,299

MEASURING APPARATUS FOR THE INSIDE OF BORES

David E. Bench and Melvin A. Crosby, Dayton, Ohio, assignors to Apco Mossberg Company, Attleboro, Mass., a corporation of Massachusetts Application December 1, 1941, Serial No. 421,192

15 Claims. (Cl. 33—178)

This invention relates to apparatus for gauging cylindrical bores, and more particularly deals with a simple tool adapted for field and shop use characterized by the fact that its operating element is a one-piece structure having a unitary motion and free from wear, frictional motion and backlash and having its parts arranged in such fashion that it is easily assembled, low in cost, light in weight, and easy to handle.

The principal purpose of our invention is to provide a tool that, due to the simplicity of its construction and operation, is readily adapted for use in connection with operations wherein it is necessary accurately to determine the internal diameter of a tubular or cylindrical element.

A further purpose of our invention has been to provide a tool of light weight and portable characteristics adapted for field and shop work wherein the measurement of a bore may be read directly on a dial without the necessity of mathematical computation or calculation.

A better understanding of the principle and application of the measuring apparatus of our invention will be had by reference to the annexed drawings in which:

Fig. 1 is a plan view of the tool of our invention;

Fig. 2 is a diagrammatic side elevational view, partly in cross section, showing the tool as applied to the measuring of the internal diameter of a cylinder;

Fig. 3 is a cross sectional view along the line 3—3 of Fig. 2;

Fig. 4 is a cross sectional view along the line 4—4 of Fig. 2;

Fig. 5 is a diagrammatic perspective view of the tool of our invention with part of its cover removed;

Fig. 6 is a diagrammatic view of the operative unitary element of the tool;

Fig. 7 is a diagrammatic view of the operative unitary element of the tool showing its application in measuring the internal diameter of a cylinder;

Fig. 8 is a diagrammatic view, partly broken away, of a modified form of the unitary operative element of the tool;

Fig. 9 is a diagrammatic view of the operative unitary element of the tool shown in Fig. 8 showing its application in measuring the internal diameter of a cylinder;

Fig. 10 shows a further modification in which the contact member is extensible to accommodate work pieces of various diameters; and Fig. 11 illustrates a manner in which the knife edge fulcrum may be suspended in a manner permitting adjusting of the sensitivity of the tool.

Referring now to the drawings in detail, 20 is a split tubular casing; 21 and 22 are rigid contact points mounted on the exterior thereof; 23 is a dial gauge; 24 is a handle; and 25 and 26 are clamping means adapted to hold the two sections of the casing together when the tool is assembled.

Referring more particularly to Fig. 2, 27 is a fixed beam firmly held in position by pivot 28 and attached at its other end to movable contact member 29, while 30 is a free beam fixedly mounted at one end thereof on movable contact member 29 and slidably associated at its other end with the operative mechanism of dial gauge 23 and the guide member 31.

Fixed beam 27 is in contact with knife edge fulcrum 32 and as the fixed contact elements 21 and 22 and the movable contact member 29 are brought into contact with the inner surface of the cylindrical member 33 the fixed beam 27 will flex as pressure is brought on the fulcrum 32 and thereby the free beam 30 is caused to move inwardly through the guide member 31 towards and against the operative mechanism of the dial gauge 23, whereby the amount of deflection of fixed beam 27 caused by the variation in internal diameter of the tubular member 33 denoted by the arrows a—a in Fig. 7 is transmitted to the free beam 30, which, in turn, travels longitudinally through the guide member 31 towards and against the operative mechanism of the dial gauge 23 to the extent denoted by the arrows b—b in Fig. 7. This travel or movement of the free beam 30 is directly converted into any desired numerical value and the dial gauge 23 may be read directly to ascertain the amount of deviation from the desired internal diameter of the tubular member 33.

Referring now to Figs. 8 and 9, 20' is the casing of the tool; 29' is the movable contact member; 27' is the fixed beam; 28' is the pivot supporting one end of the fixed beam 27'; 30' is the free beam; 31' is the guide member; and 23' is the dial gauge.

One end of the fixed beam 27' and the fixed end of the free beam 30' are fixedly held by a member 34, which, in essence, takes the place (so far as the fixing of the beam ends is concerned) of the movable contact member 29 hereinbefore described. The contact member 29' is held in association with the operative element of the tool by pin 35. When the tool is held in such position that the movable contact member 29' is perpendicular of the fixed beam 27' the inner contact point 36 of the movable contact member 29' rests on the fixed beam 27'. When the tool is held in other positions the movable contact member 29' is prevented from falling out by the pin 35.

As will be noted by reference to Fig. 9, when the movable contact member 29' is brought into operative contact with the inner surface of cylinder 33, the movable contact member 29' is forced downwardly and the contact point 36 presses on the fixed beam 27' whereby said beam is flexed downwardly about the fulcrum 32'. Due to the connection between fixed beam 27' and free beam 30' through element 34, as the fixed beam 27' arches downwardly the free beam 30' is caused to travel away from the dial gauge 23' and this causes the movement of the operative mechanism of the dial gauge 23' and gives a direct reading of the difference in internal diameter of the cylinder 33 translated into any desired numerical value.

It will be understood that while the travel of the free beam 30 in Fig. 7 is towards the dial gauge, that of the free beam 30' in Fig. 9 is away from the dial gauge. The same dial gauge may be used with either type of operative element so long as the dial gauge is marked off in the same manner on either side of the zero point. This would mean that the total direct reading permitted by the dial gauge would be defined on one-half of the face area thereof. However, it would be quite simple and satisfactory to provide a tool having each type of operative element with an appropriate dial gauge adapted to give direct numerical readings over its entire face area.

Referring now to Fig. 10, the numerals 20', 27', 29', 30', 32', 34, 35 and 36 refer to the identical elements as in Figs. 8 and 9. It will be noted, however, that the movable contact member 29' of Figs. 8 and 9 takes another form in Fig. 10. As shown in Fig. 10, the contact member 29' is provided with an extensible member 37 which may be extended or reduced in length by adjustment of the lock nut 38, whereby the over-all length of the contact member 29' may be increased or decreased according to the bore to be measured. This lends a high degree of adjustability to the tool of our invention and makes it adaptable for use on several related jobs. It is possible to provide this adjustable contact member with micrometer adjustment (not shown) whereby its length may be set according to the nature of the individual operation to be performed.

In Fig. 11, 32 is the knife edge fulcrum held in place against the walls of the casing 20 by means of shoulder means 39 and 40 and knurled knobs 41 and 42. It will be noted that the apertures 43 through which the threaded ends 44 and 45 of knife edge fulcrum 32 pass are of a diameter greater than that of said threaded ends 44 and 45. This permits shifting the position of the knife edge fulcrum 32, whereby the sensitivity of the tool may be varied according to the specific operation to be performed.

As will be noted by reference to Figs. 2, 4, 5 and 11, the end of the tool opposite its handle is closed by a cover 46 for the purpose of protecting its operative mechanism.

By reference to Fig. 4, it will be noted that it is advantageous to have the tool centered within the bore to be measured in order that readings obtained therewith may be of high accuracy. Where the length of the bore is extreme, it is advantageous to provide the tool with one or more contact members (not shown) located on the casing 20 at a point or points nearer the dial gauge for the purpose of giving better support to the tool as it is rotated or otherwise moved within the bore.

Fig. 3 shows the mode of mounting the pivot 28 supporting the fixed beam 27 in an instant application of our invention, but it will be understood that other means for fixedly mounting the fixed beam 27 may be utilized according to individual preference and circumstances.

It will be noted that, in essence, the tool of our invention is actuated and gives direct readings according to the degree or amount of flexing which is imposed by the movable contact member 29 on fixed beam 27. Since fixed beam 27 is fixedly mounted at both ends, it will flex when it is brought to bear against the pivot 32. This causes a relative shifting of the free beam 30 and causes the actuation of the operative mechanism of the dial gauge 23, whereby the dial gauge 23 will register the amount of variation in the internal diameter of the bore being tested in direct numerical values.

The distance across the three contact points may be predetermined for any given gauging job. In every instance, this distance would be in excess of the oversize limit of the bore and, as the tool entered the bore, an immediate deflection of the movable contact member would take place. This deflection, and all variations encountered in rotating the tool or moving it axially of the bore, would cause arching or deflection of the fixed beam 27 about the knife edge fulcrum 32. Simultaneously the free beam 30 would be arched and, due to the fixed relationship existing between the beams 27 and 30 (as they are fixedly mounted on movable contact member 29), the free beam 30 would creep or travel towards the dial gauge and into operative cooperation with the indicating mechanism thereof, thereby giving the reading on the dial gauge.

The tool of our invention may be designed for specific jobs or it may be constructed for general use. If the tool is to be used for normal inspection, the dial gauge may be marked off in three areas, the central one specifying the limits or tolerance permissible in the bore, and the areas on either side of this central area for oversized and undersized rejects. In this manner, the operator would be in a position quickly to determine which bores are within the specific limits of tolerance without having to make use of numerical values.

On the other hand, if the tool is to be applied to universal or general use in the shop or in the field, the dial gauge may be calibrated to give direct readings in fractions of an inch or millimeters or any other desired unit of measurement.

The use of the principle embodied in the gauging tool of our invention not only permits the transfer of the motion of the movable contact member through the dial gauge, but may very easily be adapted to magnify the original motion of the movable contact member. For example, in the particular example diagrammatically shown in Fig. 7, a magnification of approximately 2:1 is shown; in other words, the linear movement of the movable contact member 29 has caused a linear travel of the free beam 30 which is substantially twice as great. The distance traveled by each of these elements 29 and 30 is indicated by the arrows a—a and b—b in Fig. 7.

The simplicity of construction and fool-proof operation of the gauging tool of our invention will be readily appreciated by those skilled in the art. The operative mechanism of our invention is substantially free from frictional motion and is sufficiently sturdy to withstand ordinary shock and field handling without losing the degree of accuracy built into it in the course of its original calibration. This gauging tool is particularly well adapted for use in field work where it is necessary quickly and accurately to ascertain the accuracy of bores of various sorts and where more elaborate and delicate gauging apparatus do not find ready use because of their lack of sturdiness and failure to retain a predetermined degree of accuracy.

It will be understood by those skilled in the art that the details of construction hereinbefore described and illustrated in the annexed drawings may be varied to suit individual preferences and local conditions. We have described a specific embodiment of our invention solely for the purpose of illustration and it is not our intention to have our invention limited to or circumscribed by the specific details of construction and arrangement of parts hereinbefore described and illustrated in the annexed drawings. Our invention is intended to be defined within the spirit of this disclosure and the scope of the appended claims.

We claim:

1. A gauge comprising: a fixed beam pivotally mounted at one end; a free beam in association with said fixed beam; size indicating means in association with said free beam; and work contacting means in association with said fixed beam.

2. A gauge comprising: a beam pivotally mounted at one end; a second beam in association with said first mentioned beam; work contacting means uniting one end of said first mentioned beam and the corresponding end of said second beam in spaced relationship; and size indicating means operatively associated with the free end of said second beam.

3. A gauge comprising: a flexible beam pivotally mounted at one end thereof; a flexible beam attached at one end thereof in spaced relationship with the end of said firstly mentioned flexible beam opposite said pivotally mounted end; size indicating means operatively associated with the free end of said secondly mentioned flexible beam; and work contacting means in association with the spacedly attached ends of said beams.

4. A gauge comprising: a flexible beam pivotally mounted at one end thereof; a flexible beam attached at one end thereof in spaced relationship with the corresponding end of said firstly mentioned flexible beam; size indicating means operatively associated with the free end of said secondly mentioned flexible beam; and work contacting means in association with the spacedly attached ends of said beams.

5. A gauge comprising: a flexible beam pivotally mounted at one end thereof; a flexible beam united at one end thereof in spaced relationship with the end of said firstly mentioned flexible beam opposite the pivotally mounted end thereof; work contacting means in association with the spacedly united ends of said beams; fulcrum means in association with said firstly mentioned flexible beam; and size indicating means operatively associated with the free end of said secondly mentioned flexible means.

6. A gauge comprising: a flexible beam pivotally mounted at one end thereof; pivot means supporting said beam; a second flexible beam fixedly united at one end thereof in spaced relationship with the end of said firstly mentioned flexible beam opposite said pivotally mounted end; work contacting means in association with the spacedly united ends of said beams; fulcrum means in association with said firstly mentioned flexible beam intermediate said pivot means and said work contacting means; and size indicating means operatively associated with the end of said secondly mentioned flexible beam opposite the end spacedly united with said first mentioned beam.

7. A gauge comprising: a flexible beam pivotally mounted at one end thereof; pivot means supporting said beam; a second flexible beam fixedly united at one end thereof in spaced relationship with the end of said firstly mentioned flexible beam opposite said pivotally mounted end; work contacting means in association with the spacedly united ends of said beams; fulcrum means in association with said firstly mentioned flexible beam intermediate said pivot means and said work contacting means and adjacent said work contacting means; and size indicating means operatively associated with the end of said secondly mentioned flexible beam opposite the end spacedly united with said firstly mentioned beam.

8. A gauge comprising: a flexible beam pivotally mounted at one end thereof; pivot means supporting said beam; a second flexible beam fixedly mounted at one end thereof in spaced relationship with the other end of said firstly mentioned flexible beam; fulcrum means in association with said firstly mentioned flexible beam; work contacting means in association with said firstly mentioned flexible beam intermediate said pivot means and said fulcrum means; and size indicating means operatively associated with the free end of said secondly mentioned flexible beam.

9. A gauge comprising: a flexible beam pivotally mounted at one end thereof; pivot means supporting said beam; a second flexible beam fixedly mounted at one end thereof in spaced relationship with the other end of said firstly mentioned flexible beam; fulcrum means in association with said firstly mentioned flexible beam; work contacting means in association with said firstly mentioned flexible beam intermediate said pivot means and said fulcrum means and adjacent said fulcrum means; and size indicating means operatively associated with the free end of said secondly mentioned flexible beam.

10. A gauge comprising: a case; a flexible beam pivotally mounted within said case; pivot means supporting said flexible beam; a second flexible beam fixedly mounted at one end thereof in spaced relationship with the other end of said firstly mentioned flexible beam; work contacting means in association with the spaced fixed ends of said beams; an aperture in said case adapted to permit passage therethrough of said work contacting means; fulcrum means in association with said firstly mentioned flexible beam intermediate said pivot means and said work contacting means; and size indicating means operatively associated with the free end of said secondly mentioned flexible beam mounted on said case.

11. A gauge comprising: a case; a handle at one end of said case; contact means fixedly mounted on said case; a flexible beam pivotally mounted within said case; pivot means supporting said flexible beam; a second flexible beam fixedly mounted at one end thereof in spaced relationship with the other end of said firstly mentioned flexible beam; work contacting means in association with the spaced fixed ends of said beams; an aperture in said case adapted to permit passage therethrough of said work contacting means; fulcrum means in association with said firstly mentioned flexible beam intermediate said pivot means and said work contacting means and adjacent said work contacting means; and size indicating means operatively associated with the free end of said secondly mentioned flexible beam.

12. A gauge comprising: a case, a handle at one end of said case; a plurality of contact members fixedly mounted on said case; a flexible beam pivotally mounted within said case; pivot means supporting said flexible beam; a second flexible beam fixedly mounted at one end thereof in spaced relationship with the other end of said firstly mentioned flexible beam; fulcrum means in association with said firstly mentioned flexible beam; work contacting means in association with said firstly mentioned flexible beam intermediate said pivot means and said fulcrum means; and size indicating means operatively associated with the free end of said secondly mentioned flexible beam.

13. A gauge comprising: a case; a handle at one end of said case; a plurality of contact members fixedly mounted on said case; a flexible beam pivotally mounted within said case; pivot means supporting said flexible beam; a second flexible beam fixedly mounted at one end thereof in spaced relationship with the other end of said firstly mentioned flexible beam; fulcrum means in association with said firstly mentioned flexible beam; work contacting means in association with said firstly mentioned flexible beam intermediate said pivot means and said fulcrum means and adjacent said fulcrum means; and size indicating means operatively associated with the free end of said secondly mentioned flexible beam.

14. A gauge comprising: a case; a handle at one end of said case; a plurality of contact members fixedly mounted on said case; a flexible beam pivotally mounted within said case; pivot means supporting said flexible beam, said pivot means being movably mounted on said case; a second flexible beam fixedly mounted at one end thereof in spaced relationship with the other end of said firstly mentioned flexible beam; work contacting means in association with the spaced fixed ends of said beams, said work contacting means being adapted to be increased and reduced in length according to the operation to be performed; an aperture in said case adapted to permit passage therethrough of said work contacting means; fulcrum means in association with said firstly mentioned flexible beam intermediate said pivot means and said work contacting means, said fulcrum means being adjustably mounted on said case; and size indicating means operatively associated with the free end of said secondly mentioned flexible beam mounted on said case.

15. A gauge comprising: a case; a handle at one end of said case; a plurality of contact members fixedly mounted on said case; a flexible beam pivotally mounted within said case; pivot means supporting said flexible beam, said pivot means being movably mounted on said case; a second flexible beam fixedly mounted at one end thereof in spaced relationship with the other end of said firstly mentioned flexible beam; fulcrum means in association with said firstly mentioned flexible beam, said fulcrum means being adjustably mounted on said case; work contacting means in association with the spaced fixed ends of said beams, said work contacting means being adapted to be increased and reduced in length according to the operation to be performed; an aperture in said case adapted to permit passage therethrough of said work contacting means; and size indicating means operatively associated with the free end of said secondly mentioned flexible beam mounted on said case.

DAVID E. BENCH.
MELVIN A. CROSBY.